May 23, 1967 P. B. JOHNSON ETAL 3,320,806
LIQUID LEVEL GAUGE
Filed March 27, 1964 3 Sheets-Sheet 2
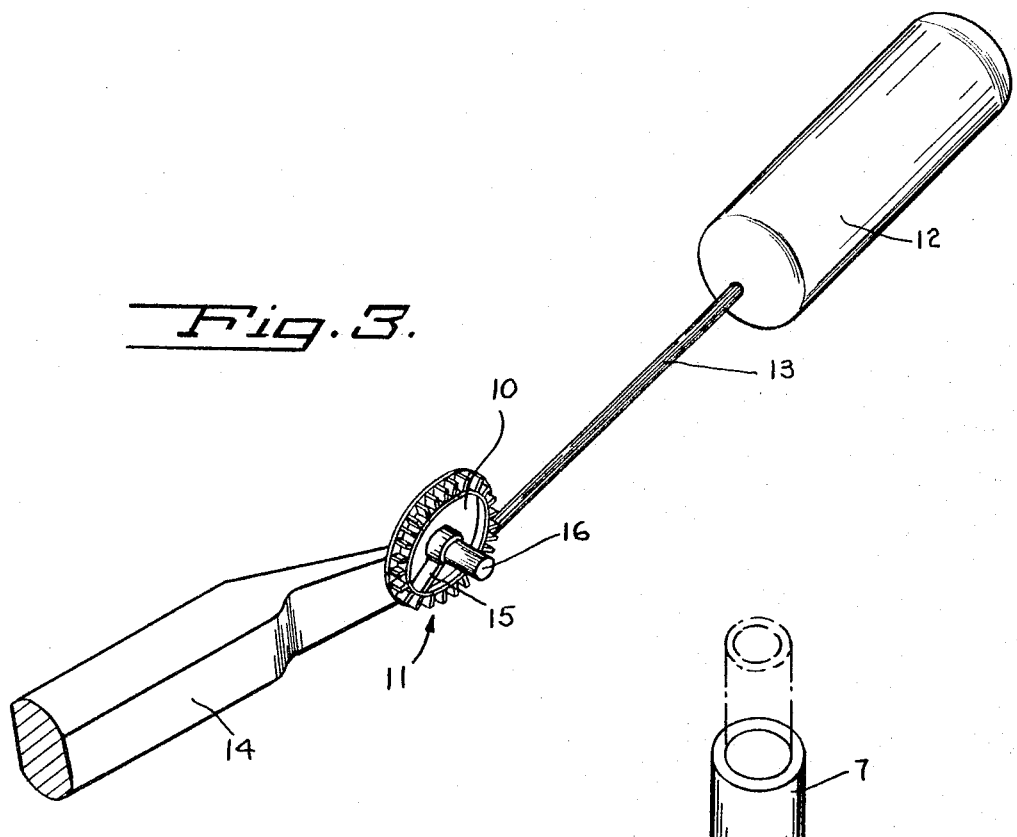
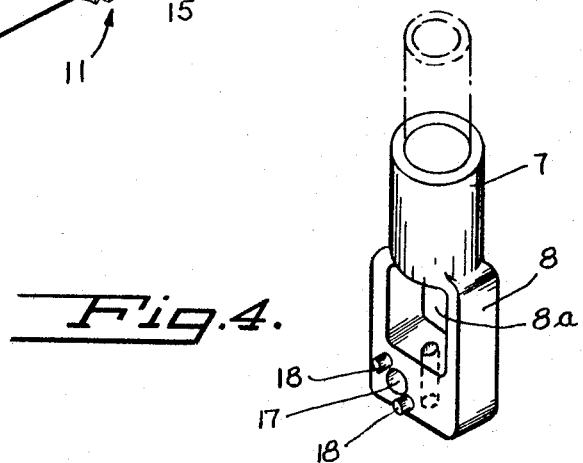
INVENTORS.
PAUL B. JOHNSON
EUGENE D. HUSKEY
BY
ATTORNEY.

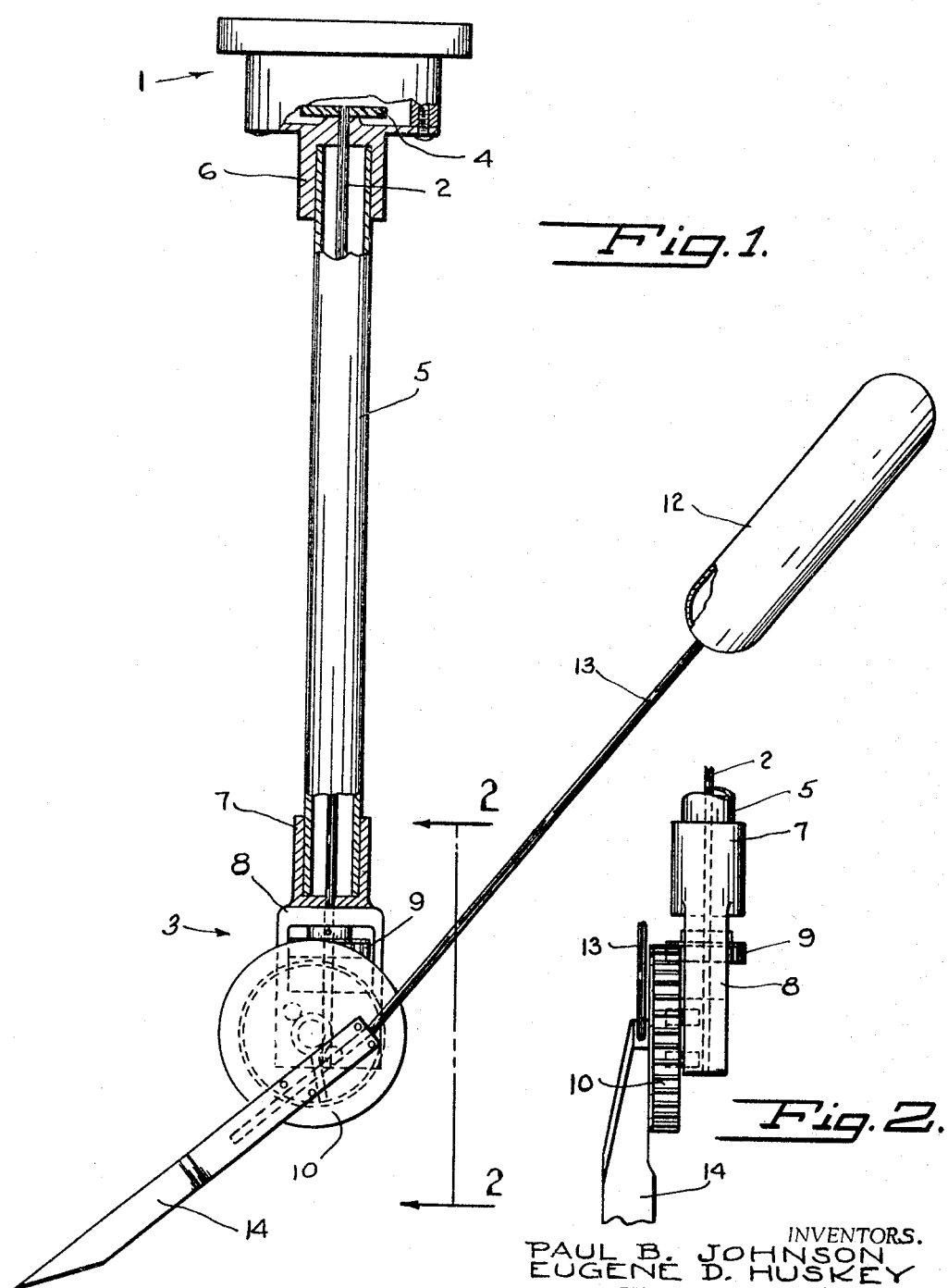

May 23, 1967  P. B. JOHNSON ETAL  3,320,806
LIQUID LEVEL GAUGE
Filed March 27, 1964  3 Sheets-Sheet 3
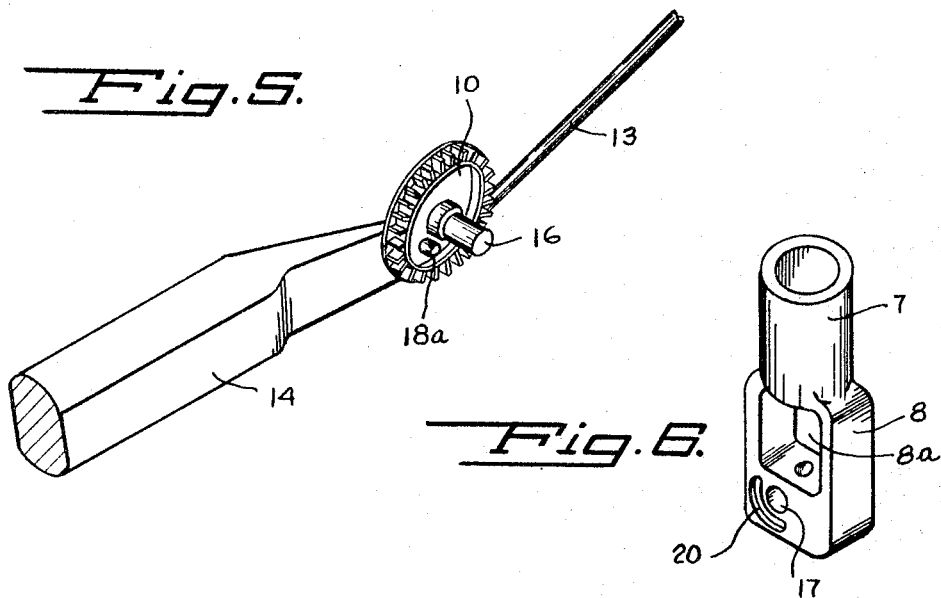
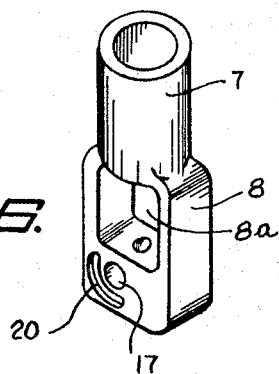
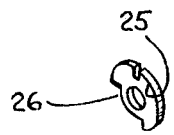
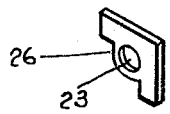
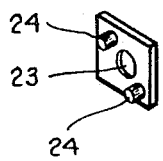
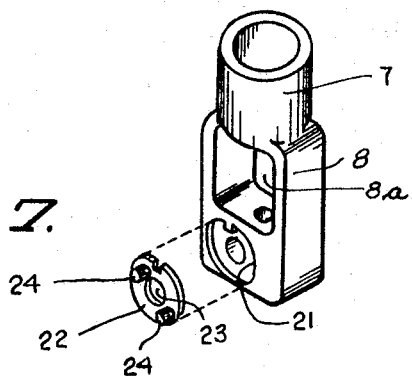
INVENTORS.
PAUL B. JOHNSON
EUGENE D. HUSKEY
BY
Raymond A. Paquin
ATTORNEY.

United States Patent Office 3,320,806
Patented May 23, 1967

3,320,806
LIQUID LEVEL GAUGE
Paul B. Johnson and Eugene D. Huskey, Garland, Tex., assignors to J. Y. Taylor Mfg. Company, a corporation of Texas
Filed Mar. 27, 1964, Ser. No. 355,295
1 Claim. (Cl. 73—317)

This invention relates to new and useful improvements in liquid level gauges, and has particular reference to leakproof magnetic type liquid level gauges for fluids or liquified gases and especially those stored under pressure such as, by way of specific example, butane or propane.

Liquid level gauges or indicating devices of the class herein disclosed are, generally speaking, usually manufactured by a die casting process such as to be either top, end, or angularly mounted upon the tank, cylinder, or other container with which they are to be utilized.

Furthermore, as the relative range of movement desired of the float-counterweight members comprising such a gauge is largely dependent upon whether said gauge is to be top, end, or angularly mounted upon said tank, cylinder, or other container, it is necessary that gauges comprised of float-counterweight members hav ing different angular ranges of movement be constructed for said different modes or methods of mounting.

Thus, during the die casting process in which said gauges are constructed, it is frequently necessary that a change be made from the manufacturing, or die casting, of a gauge intended for one form of mounting to the manufacturing, or die casting, of a gauge intended for another, and different, form of mounting. Conventionally, this change in the nature of the gauge being constructed is accomplished by the changing of the gear die or mold utilized to cast the gear on the float-counterweight assembly of the gauge. In this manner, said gear may be changed such as to be such as required for the desired form of completed gauge.

This method of changing from the die casting of a gauge intended for one form of mounting to that required for another, and different, form of mounting possesses, however, several serious deficiencies and disadvantages.

In the first place, the gear die currently in use can not be changed to another, and desired, form of gear die until it cools sufficiently for such change to be made; and, thus, valuable manufacturing time is lost while said die is allowed to cool, thereby adding to both the time, and expense required for the construction of the completed gauge.

Furthermore, even after said gear die has been allowed to cool to a temperature such that it may be removed, additional manufacturing time is lost and added expense is incurred while said die is being changed to the desired form of gear die.

Furthermore, the conventional method of constructing a conventional gauge of this type also requires the storage of said gear dies when such are not in use, the transportation of such from their place of storage to the location of the casting, and many other disadvantages and excessive requirements which add greatly to the time and expense required to produce the completed gauge.

From the foregoing, it will be seen that said conventional method of constructing a conventional liquid level gauge or indicating means of the class herein disclosed suffers from the combined disadvantages and deficiencies of lack of economy of manufacturing time, lack of economy of manufacturing expense, and, as will be hereinafter shown, complexity of construction.

As a result of such shortcomings and disadvantages of the method through which it is made, the conventional liquid level gauge or indicating device of said class, furthermore, is, itself, made subject to these deficiencies and shortcomings.

An object of the present invention is to provide a new and improved gauge or indicating device of the class herein disclosed which is relatively economical and simple in construction.

Another object of the present invention is to provide a new and improved gauge of the type set forth which is easily adapted, during its construction, for any form of gauge mounting required.

Another object of the present invention is to provide a new and improved gauge of the type set forth which is so constructed that, during the making of said gauge, the gear die need not be changed whenever the form of completed gauge is to be changed to one particularly suited for a given form of mounting.

Another object is to provide a new and improved gauge of the type set forth which includes a float, counterweight, and gear which are formed effectively integral with one another, thereby providing an accurate, trouble-free construction.

Other objects and advantages of the invention will be apparent from the following description taken in connection with the accompanying drawings. It will be understood that changes may be made in the details of construction and arrangement of parts shown and described as the preferred form of invention has been given by way of illustration only.

Referring to the drawings:

FIG. 1 is a partial sectional view of a gauge embodying the present invention;

FIG. 2 is a fragmentary end view of said gauge taken along line 2—2 of FIG. 1 looking in the direction of the arrows;

FIG. 3 is a fragmentary view of the float-gear-counterweight portion of the gauge shown in FIG. 1;

FIG. 4 is a fragmentary view illustrating the gauge fork of said gauge illustrated in FIG. 1;

FIG. 5 is a view illustrating the counterweight-gear assembly of a modified form of the present invention;

FIG. 6 is a view illustrating the gauge fork of the form of invention illustrated in FIG. 5;

FIG. 7 is a view illustrating the gauge fork of another modified embodiment of the present invention; and FIGS. 8 through 10 are detailed views of different forms of stop inserts which may be utilized in accordance with the form of gauge fork of FIG. 7.

Referring more particularly to the drawings wherein similar reference characters designate corresponding parts throughout the several views, and with particular reference to FIG. 1, the device illustrated therein comprises a gauge which includes a gauge head designated generally at 1 and having a dial and associated indicating means, a rotatably mounted shaft 2 having a magnet 4 operatively mounted upon its upper end such that rotation of said shaft 2 imparts rotation to said magnet 4, and a pivotally mounted actuating arrangement designated generally at 3 for causing rotation of said shaft 2. Gauge head 1 and its enclosed mechanism and apparatus are substantially similar to that disclosed in U.S. Patent No. 2,578,104, issued Dec. 11, 1951, to James Y. Taylor; and shaft 2 is enclosed within and surrounded by cylindrical or tubular member 5, said cylindrical member 5 being secured adjacent its opposite ends to the annular flange 6 of gauge head 1 and the flange 7 on the gauge fork or pivot fork 8, which gauge fork 8, as will be seen from FIG. 4, includes an opening or slot 8a.

Gear 9 is provided upon the lower end of the shaft 2 within said slot 8a in fork 8 and is adapted to mesh with the drive gear 10 of the float-counterweight assembly, which is shown at 11 and is illustrated in detail in FIG. 3, such as to enable said gear 10 to drive the shaft 2. Said gears 9 and 10, in combination, comprise the actuating mechanism 3 of the apparatus.

With particular reference to the float-counterweight assembly which is designated generally at 11 and shown in detail in FIG. 3, such comprises the float 12 and float arm 13 and the counterweight 14 which are effectively formed integral or united with the gear 10. Said gear 10, furthermore, is provided with an integrally formed bar shaped stop 15 upon one of its sides and is provided with the shaft 16. Said stop 15 need not be of bar shape as illustrated, but rather may be of any suitable configuration.

The one piece die cast gauge or pivot fork 8, as will be seen from FIG. 4, includes a bore opening 17 adapted to receive said shaft 16, said bore or opening 17 being of such dimensions as to allow pivotal movement of said shaft 16 therein. Said pivot fork 8, is further, provided with a pair of angle stops 18 positioned adjacent to, and on opposite sides of, said bore or opening 17 such as to engage the stop 15 upon the side of the gear 10 and, thereby, limit the pivotal movement of the gear 10. Said angle stops 18 may be positioned about said opening 17 at any positions that may be required in order to provide said gear 10 with, or to restrict said gear to, the required angular movement necessary for the form of gauge mounting desired. It will be seen that the degree of angular movement of said gear 10 may be, thus, determined by the positioning of said stops 18 upon the fork 8 and; thus, the amount of angular movement permitted of said gear may be controlled by said positioning of said stops. Furthermore, the positioning of the stop 15 upon the gear 10 may be changed during the die casting process in which said gear is constructed such as to provide said gear 10 with the degree of pivotal movement required. Furthermore, although the angular stops 18 are disclosed as being upon the pivot or gauge fork 8 and the bar stop is disclosed as being upon the gear 10, it will be understood that said stops may be reversed in location.

In the die casting process of the float-counterweight assembly disclosed in FIG. 3, a preconstructed, steel, one-piece float 12 and a preconstructed, steel, float arm 13 are positioned within the die or mold, and the remainder of the FIG. 3 disclosed structure cast integrally with said preconstructed members. The gear 10 having the stop 15 is, thus, completely cast of die casting material, and may be cast in any configuration suitable for use in any mounting form of completed gauge by the mere rotation or positioning of the gear die such that the stop 15 is constructed in such angular configuration that its interaction with the angular stops 18 upon the pivot fork 8 will restrict the pivotal movement of the completed gear 10 to those limits suitable for the form of gauge desired.

Furthermore, during the construction of the gauge provided by the present invention, in order for a change to be made from the casting of a gauge intended for one form of mounting to that desired for a different form of mounting, the gear die need merely be rotated such that said stop 15 is formed in such an angular configuration that the pivotal movement of the completed gear 10 will be within the range required for the form of gauge mounting required.

With particular regard to the construction of the gauge or pivot fork 8, such, also, is die cast. Thus, instead of positioning the gear die for the casting of the gear 10 such that said completed gear is cast with the stop 15 in different positions depending upon the particular form of mounting required of the completed gauge which includes said gear 10, or in addition thereto should such be desired, the angular stops 18 upon the fork 8 may be varied in position such as to, through the interaction of said stops 18 with the stop 15 upon the gear 10, restrict the pivotal movement of the gear 10 to the range required for the form of gauge being cast.

It will be apparent from the foregoing that the configuration of the gear 10 and/or of the fork 8 may, during the die casting thereof, be simply, economically, and readily changed as may be required; and that, furthermore, the construction of a form of gauge intended for one form of mounting may be readily terminated, and that designed for another form of mounting commenced without the usual, conventional, attendant losses in manufacturing time and expense.

With particular reference to FIGS. 5 and 6 of the drawings, such illustrate a modified form of the gauge of the present invention. In such modified form of gauge construction, the gear 10 of the float-counterweight assembly is provided with a pin shaped stop 18a upon one of its sides; and the pivot or gauge fork 8 is provided with a corresponding variable position groove or slot 20 of such configuration as to limit the angular movements of the pin 18a, and hence of the gear 10, to those required for the form of gauge desired.

Furthermore, as the angular position and configuration of said slot 20 in the pivot fork 8 can be constructed of virtually any desired shape and size during the die casting of said fork 8, a gauge can be readily and speedily constructed which is suitable for any desired form of mounting; and the construction of one form of gauge designed for one form of mounting may be readily terminated and that of a gauge intended for another form of mounting speedily and readily commenced during the die casting process utilized for constructing said gauge by the mere substitution of fork dies and without the usual attendant losses in manufacturing time and expense usual in such a change-over process.

Also, through the rotation of the gear die from which the gear 10 is cast, the angular relationship of the gear 10 to the remainder of the float-counterweight assembly may be changed and the desired change in the form of gauge, thereby, produced.

Furthermore, as the angularly shaped slot and the pin stop 19 may be reversed such that said slot is in the gear 10 and said pin is on the fork 8 without departing from either the spirit or the scope of the invention, it will be apparent that, during the die casting process through which said gauge components are constructed, a wide variation of gauges destined for a similarly wide variation of mounting positions may be constructed through the use of the present invention.

With reference to the modified form of the invention disclosed by FIGS. 7 through 10, and with particular reference to the apparatus of FIG. 7, in the therein illustrated form of the invention the fork 8 is provided with a cut-away portion or recess 21 adjacent the bore or opening 17 for the shaft 16, said cut-away portion 21 being adapted to receive a variable position insert stop of matching shape such as those illustrated in FIGS. 7 and 8.

The form of stop insert 22 which is shown in said FIG. 7 includes an opening or bore section 23 positioned therein such as to correspond with the bore or opening 17 in the one piece fork 8 and, thereby, permit entry of the shaft 16 on the gear 10 into said bore or opening 17, and a pair of angle stops 24 adapted to cooperate with the bar stop 15 on a gear 10 which is constructed substantially as that shown in FIG. 3. Insert 22 is suitably keyed in recess 21 in fork 8.

FIG. 8 illustrates a form of insert stop 25 which includes a cut-away or grooved portion 26 and which, further, is adapted to cooperate with a pin shaped stop on a gear constructed substantially as that disclosed in FIG. 5.

FIGS. 9 and 10 illustrate forms of insert stops corresponding to those shown in FIGS. 8 and 7, respectively, said inserts being, however, of substantially square shape as opposed to the substantially circular shape of the inserts of said FIGS. 7 and 8. The cut-away or recessed portion of the fork with which said FIGS. 9 and 10 inserts are utilized would be, of course, shaped of square configuration such as to receive said square inserts.

Furthermore, in the form of the present invention disclosed in FIGS. 7 through 10, the form of mounting for which the completed gauge would be suited would, of course, be determined by either the angular displacement of the slot in the insert piece in the case of the FIGS. 8 and 9 inserts, the angular displacements of the pin stops in the case of the FIGS. 7 and 10 inserts, or the positioning of the stop member on the gear 10, all of which may be pre-set during the manufacturing process as previously described.

Furthermore, it will be seen that, as the stops are provided on insert pieces, the limits of pivotal movement of the gear 10 may, also, be readily and speedily adjusted by the substitution of said insert pieces.

It will be understood that, although FIGS. 7 through 10 illustrate the recess 21 in which the insert stops are positioned as being in the fork 8, said recess and insert stops could be positioned upon the gear 10, itself, providing that the fork 8 was provided with a stop substantially similar to either the stop 15 disclosed in FIG. 3 or the stop 19 disclosed in FIG. 5, as required by the form of stop on the insert in the gear 10.

The operation of the device is believed to be apparent from the foregoing description.

In view of the foregoing it will be seen that we have provided new and improved means for accomplishing all of the objects and advantages of the invention.

We claim:

In a device of the character described, a dial and associated indicating means, means for causing movement of said indicating means relative to said dial, a rotatable shaft opertively connected to said means for causing movement, a first gear member adjacent one end of said shaft, a fork member adjacent said first gear member, an arm angularly disposed relative to said shaft, a float member on said arm adjacent one end thereof, a counterweight on said arm adjacent the opposite end thereof, a second gear member on said arm and adapted to operatively engage said first gear member, a shaft pivotally mounting said second gear member relative to said fork, and means for limiting the pivotal movement of said second gear member relative to said fork, said limiting means comprising cooperating stop means on said second gear member and said fork, said stop means comprising a recess in said fork member and an insert in said recess, said insert having stops and a cooperating stop on said second gear member.

References Cited by the Examiner

UNITED STATES PATENTS

| 714,377 | 11/1902 | Jeavons | 73—317 |
|---|---|---|---|
| 1,252,683 | 1/1918 | Gelatt | 73—317 |
| 1,481,322 | 1/1924 | Kellum | 73—317 X |
| 1,854,266 | 4/1932 | Lundquist | 73—31 |
| 2,578,104 | 12/1951 | Taylor | 73—317 |

LOUIS R. PRINCE, *Primary Examiner.*

D. M. YASICH, *Assistant Examiner.*